US006859284B2

(12) United States Patent
Rella et al.

(10) Patent No.: US 6,859,284 B2
(45) Date of Patent: Feb. 22, 2005

(54) APPARATUS AND METHOD FOR DETERMINING WAVELENGTH FROM COARSE AND FINE MEASUREMENTS

(75) Inventors: Chris W. Rella, Sunnyvale, CA (US); Alexander Katchanov, Sunnyvale, CA (US)

(73) Assignee: Picarro, Inc., Sunnyvale, CA (US)

( * ) Notice: Subject to any disclaimer, the term of this patent is extended or adjusted under 35 U.S.C. 154(b) by 281 days.

(21) Appl. No.: 10/308,779

(22) Filed: Dec. 2, 2002

(65) Prior Publication Data

US 2004/0105098 A1 Jun. 3, 2004

(51) Int. Cl.[7] ................................................ G01B 9/02
(52) U.S. Cl. ....................................................... 356/519
(58) Field of Search ............................... 356/450, 451, 356/454, 519

(56) References Cited

U.S. PATENT DOCUMENTS

| | | | |
|---|---|---|---|
| 3,967,211 A | 6/1976 | Itzkan et al. ............... 331/94.5 |
| 4,172,663 A | 10/1979 | Byer et al. .................. 356/352 |
| 4,173,442 A | 11/1979 | Snyder ........................ 356/346 |
| 4,815,081 A | 3/1989 | Mahlein et al. ............... 372/32 |
| 5,420,687 A | 5/1995 | Kachanov .................... 356/353 |
| 5,798,859 A | 8/1998 | Colbourne et al. ......... 359/247 |
| 5,896,201 A | * | 4/1999 | Fukushima ................. 356/394 |
| 6,122,301 A | 9/2000 | Tei et al. ....................... 372/32 |
| 6,178,002 B1 | 1/2001 | Mueller-Wirts ............. 356/491 |
| 6,289,028 B1 | 9/2001 | Munks et al. ................. 372/20 |
| 6,331,892 B1 | 12/2001 | Green ........................ 356/451 |
| 6,400,737 B1 | 6/2002 | Broutin et al. ................ 372/20 |
| 6,587,214 B1 | * | 7/2003 | Munks ........................ 356/519 |
| 6,795,188 B2 | * | 9/2004 | Ruck et al. .................. 356/416 |

* cited by examiner

*Primary Examiner*—Samuel A. Turner
*Assistant Examiner*—Michael A. Lyons
(74) *Attorney, Agent, or Firm*—Lumen Intellectual Property Services, Inc.

(57) ABSTRACT

The present invention provides an apparatus for determining a wavelength of an optical signal by determining a coarse wavelength response and a fine wavelength response. The coarse wavelength response is achieved by utilizing an optical filter. A suitable detector detects the wavelength-dependent response and conveys the determined coarse wavelength response to the processing logic. The fine wavelength response is achieved by utilizing an interferometer that is capable of generating an interference pattern. Two detectors are disposed in the interference pattern at a quadrature separation from each other and detect the intensity responses at their respective locations. The intensity responses are conveyed to a unit that determines the fine wavelength response. Finally, the processing logic determines the wavelength utilizing the determined coarse wavelength response and the determined fine wavelength response.

48 Claims, 6 Drawing Sheets

APPARATUS AND METHOD FOR DETERMINING WAVELENGTH FROM COARSE AND FINE MEASUREMENTS

RELATED APPLICATIONS

This application is related to copending, commonly assigned and concurrently filed patent application entitled Laser Tuning by Spectrally Dependent Spatial Filtering (Ref. No. PCR-102/CIP).

FIELD OF THE INVENTION

The present invention relates generally to an apparatus and a method for determining the wavelength of an optical signal by providing both a coarse and a fine wavelength measurement.

BACKGROUND OF THE INVENTION

Numerous applications require optical sources capable of generating optical output at stable and controllable wavelengths. For example, semiconductor laser diodes capable of delivering optical signals at stable and controllable wavelengths have become essential in wavelength-division multiplexing (WDM) and dense wavelength-division multiplexing (DWDM) telecommunications. Like most solid state sources, semiconductor laser diodes experience shifts in output wavelength due to temperature variation, changes in threshold current, degradation and/or aging. Such shifts in wavelength may result in disturbances affecting the operation of entire telecommunications networks.

In a practical optical telecommunications network based on dense wavelength-division multiplexing (DWDM), the light from several semiconductor lasers is combined onto a single optical fiber. To prevent cross-talk between these signals, it is crucial that each of the lasers in the system be tuned to a different wavelength. More specifically, the frequencies of the individual lasers are selected from a specific grid of frequencies (called the I.T.U. frequency grid).

There are several methods and devices, often referred to as wavelength-locking and wavelength lockers, that produce outputs proportional to the difference between an input light frequency and the ITU grid frequencies. Wavelength lockers utilize one or more optical filters such as transmission filters, reflection filters, interference filters, Fabry-Perot etalons, etc. and associated detectors to provide wavelength readout. These approaches tend to be simple, but they have a limited wavelength resolution. In general, the wavelength readouts obtained are translated into an error signal, and this error signal is used as a feedback signal to tune the laser temperature, current, or other operating parameter to keep the laser frequency near the desired grid frequency.

Some examples of prior art wavelength lockers that use one or more optical filters to provide wavelength readout include U.S. Pat. Nos. 4,815,081; 6,122,301; 6,400,737; 6,289,028 and 4,172,663. More specifically, U.S. Pat. No. 4,815,081 to Mahlein et al. teaches the use of a first optical detector device and a wavelength selective optical filter. The part of the power that passes through the filter is delivered to a second opto-electrical detector. The detectors are used to measure optical power and the emission wavelength, respectively, and yield two control signals for the injection current to control the laser. U.S. Pat. No. 6,122,301 to Tei et al. teaches the use of an interference filter and two detectors for measuring wavelength to produce a laser light source capable of stable emission. In U.S. Pat. No. 6,400,737 Broutin et al. teach an improvement to a wavelength-locker based on an interferometer in a closed-loop feedback control system to automatically adjust gain in a temperature tuned, wavelength stabilized laser. U.S. Pat. No. 6,289,028 to Munks et al. teaches a method and apparatus for monitoring and control of laser emission wavelength based on at least one optical filter. In accordance with the described method two separate beams are derived from the laser radiation by the one or more optical filters. A beam comparison element compares the first and second filtered beams and produces from them an error signal representative of the deviation of the wavelength of the laser from a set-point wavelength. The filters are set up so that the wavelength locking point is the wavelength at which the signals from the two detectors are equal. The filter tilt is chosen to set this wavelength (also called the "crossing wavelength"). Finally, in U.S. Pat. No. 4,172,663 Byer et al. teach the use of one or more interferometers in an optical wavelength meter.

Another prior art approach to wavelength locking is based on creating an interference pattern and determining changes in wavelength from the shifting of interference fringes detected by a number of detectors, e.g., a detector array. For example, U.S. Pat. No. 4,173,442 to Snyder teaches the use of a wedged interferometer (Fizeau-type interferometer) in a collimated beam to create a spatial interference pattern (i.e., interference fringes) in reflection mode. The fringes are imaged on a photoelectric receiver, typically a detector array, and the wavelength is determined from the measured location of the fringe minima (also called the "zero crossing"). The reader is referred to U.S. Pat. Nos. 3,967,211; 5,420,687 and 5,798,859 for still other approaches using the shift in an interference pattern to determine wavelength.

Unfortunately, the performance of prior art wavelength lockers is usually limited by difficulties encountered in providing high-precision temperature compensation over the operating range of the semiconductor laser without resorting to expensive on-board thermo-electric control. In wavelength lockers using etalons the temperature affects the optical path length in the etalon, which ultimately translates into wavelength errors for the locked laser. This design also suffers from the disadvantage that the high precision etalon (oftentimes a multi-element, air-spaced design) is costly, and that one cannot determine on which wavelength channel the laser is running, because wavelength lockers do not measure absolute wavelength.

The prior art also teaches the use of wavemeters. These devices determine the precise wavelength of the optical signal. In fact, in some cases wavemeters are capable of simultaneously measuring multiple wavelengths with high accuracy. Unfortunately, these devices are generally too large and costly for applications in telecommunications.

More recently, an approach for monitoring the precise wavelength of an optical beam has been proposed by Green in U.S. Pat. No. 6,331,892. Green uses an interferometer to create a constructive/destructive interference measured by a detector. The maximum and minimum length of the path traversed by the second beam in the interferometer are precisely controlled with a micro-positionable semiconductor retroreflector or mirror.

Using known oscillations of the retroreflector measured along the path of the second beam enables the user to obtain precise and repetitive measurements of the wavelength. Green also teaches that the detector measuring the interference pattern be implemented by three sensors for sampling the fringe pattern at three distinct locations when there is no micro-positionable retroreflector. These locations are preferably chosen such that the phase shift between signals from the individual detectors is approximately 90°, thus avoiding situations where the signal(s) from any detector(s) falls under a peak or valley of the interference pattern, since in these locations the sensor will be largely insensitive to wavelength variations, since the slope of the interference pattern at a fringe peak or valley is zero.

Although Green's teaching resolves a number of the prior art problems, it still requires a complex apparatus, including the oscillating retroreflector or three sensors in the interference pattern to obtain wavelength information.

Yet another teaching of a method and device for measuring and stabilization of a laser frequency using an interferometer and sensor signals derived from the interference pattern in 90° phase relationship is provided in U.S. Pat. No. 6,178,002 to Mueller-Wirts. The Muller-Wirts patent analyzes both the transmission and reflection signals of a wedge shaped interferometer to obtain correction of the laser frequency. However, this approach provides only for wavelength locking, since it is not capable of determining absolute wavelength.

In general, the last two prior art approaches provide high wavelength resolution, but require significant processing of the information from the detectors (for example curve fitting to determine spacing of fringes). The primary disadvantage of these methods and devices is that they cannot be used to easily and cheaply ascertain which particular channel the errors are associated with.

OBJECTS AND ADVANTAGES

An objective of the present invention is to provide an apparatus that is able to determine the wavelength of an optical signal, in particular an apparatus that utilizes only two detectors to sample the spatial interference/fringe pattern to provide fine wavelength information and a supplementary filter and associated detector combination to provide coarse wavelength information. In essence, it is an objective of the present invention to provide an apparatus for and an associated methodology to determine the absolute wavelength of an optical signal by determining both a coarse wavelength response and a fine wavelength response, and then combining the two responses to derive the absolute wavelength.

Another objective of the present invention is to integrate the functionality of the coarse wavelength response and the fine wavelength response into a single, easy-to-fabricate and inexpensive device.

These and other advantages of the present invention will become apparent upon reading the following description.

SUMMARY

To address the shortcomings of the prior art the present invention provides an apparatus for determining the wavelength of an optical signal from a coarse wavelength response and a fine wavelength response. The coarse wavelength response is obtained by a detection mechanism from an optical filter that has a wavelength-dependent response to the optical signal. The optical filter can be an element whose wavelength-dependent response is electrical or an element whose wavelength-dependent response is optical, such as a varying reflection and/or transmission level. The detection mechanism is any suitable detector or circuit, depending on the type of wavelength-dependent response, i.e., electrical or optical, delivered by the optical filter. For the purpose of obtaining the fine wavelength response the apparatus has an interferometer for receiving the optical signal and generating from it an interference pattern. Two photodetectors are placed in the interference pattern at a quadrature separation from each other, i.e., at locations in the interference pattern that are $\pi/4$ or 90° out of phase. The two photodetectors generate two corresponding intensity signals from which a unit determines the fine wavelength response. The apparatus is also equipped with a processing logic for determining the wavelength from the coarse and fine wavelength responses.

In one embodiment the interferometer is an etalon, preferably a wedge etalon. The optical signal is incident on the etalon from a predetermined angle to obtain the interference pattern between light reflected off or from the front surface and the back surface of the etalon. To obtain a clean interference pattern the apparatus is also equipped with a device such as an aperture for eliminating higher-order reflections from propagating from the interferometer to the two photodetectors.

Various types of optical filters can be employed by the apparatus of the invention to generate the wavelength-dependent response. Preferably, the optical filter is a wavelength filter that has a wavelength-dependent response that is linear. In one particular embodiment the optical filter is a transmission filter. More specifically, the transmission filter is a coating. In another embodiment, the optical filter is a reflection filter. Once again, a coating can be used as the reflection filter.

In a preferred embodiment of the apparatus the interferometer and the optical filter are integrated. In particular, the interferometer is an etalon and the optical filter is a coating deposited on the back surface of the etalon. Here the coating functions as a reflection filter. It is preferable, in this embodiment, that the coating have a linear wavelength-dependent response. Furthermore, in this embodiment, the detection mechanism for determining the coarse wavelength response can be the combination of the two photodetectors located at quadrature separation in the interference pattern.

The method of the present invention is designed to determine a wavelength of an optical signal by providing an optical filter having a wavelength-dependent response to the optical signal and determining a coarse wavelength response from the optical filter's wavelength-dependent response. The method further involves passing the optical signal through an interferometer to generate an interference pattern and placing two detectors in the interference pattern at a quadrature separation from each other. The two detectors generate two corresponding intensity signals that are used for determining a fine wavelength response. The wavelength of the optical signal is then determined from the coarse and fine wavelength responses.

In a preferred embodiment, where the interferometer is an etalon and the optical filter is a reflective coating deposited on the back surface of the etalon, the coarse wavelength response can be determined from a total intensity measurement. In particular, it can be obtained from the total intensity obtained from adding the signals of the two detectors positioned in the interference pattern.

In another embodiment, the two intensity signals obtained from the two detectors positioned in the interference pattern are plotted in an x-y plane. Meanwhile, the coarse wavelength response is plotted along a z-axis. This 3-dimensional representation of the fine wavelength response and coarse wavelength response traces a corkscrew pattern and enables a particularly effective visualization of the wavelength of the optical signal.

A detailed description of the invention and the preferred and alternative embodiments is presented below in reference to the attached drawing figures.

DETAILED DESCRIPTION

Figure 1A:
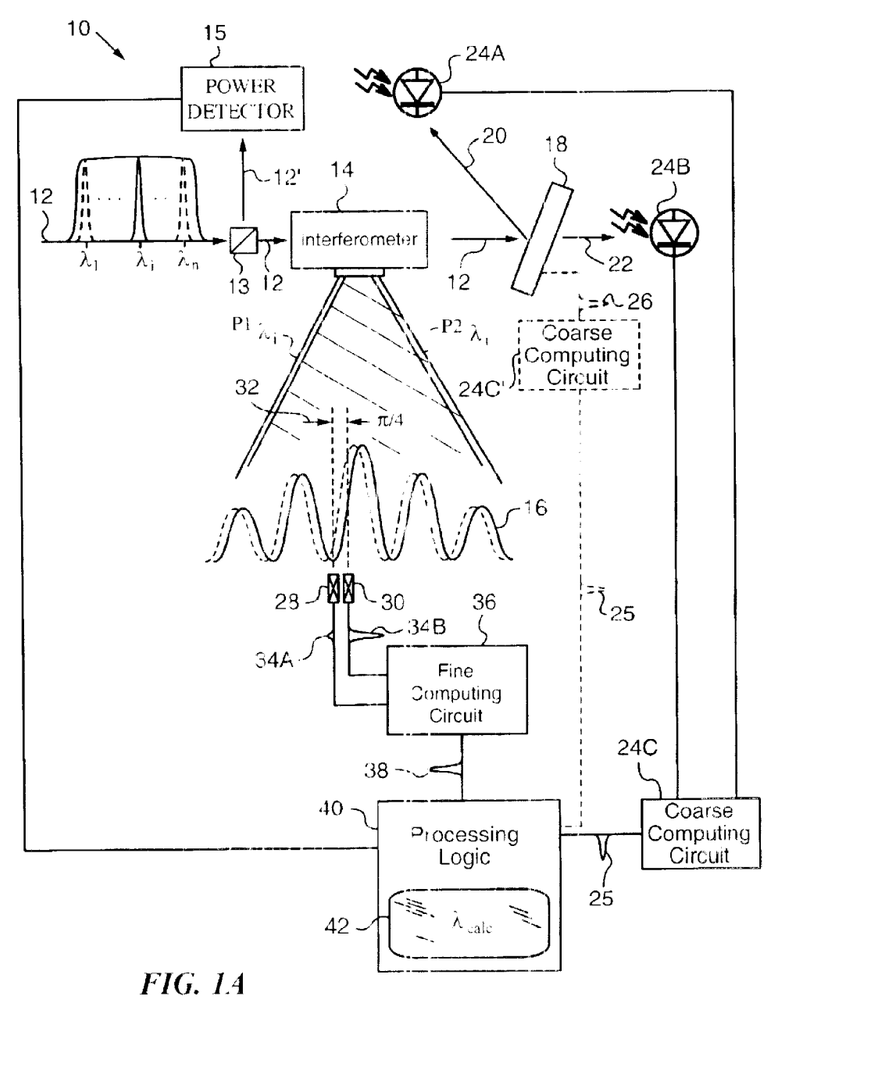
FIG. 1A is a diagram illustrating an apparatus for determining a wavelength of an optical signal according to an embodiment of the invention.

FIG. 1A illustrates an apparatus 10 for determining a wavelength of an optical signal 12 according to an embodiment of the present invention. Optical signal 12 can be obtained directly from an optical source, for example a semiconductor laser diode (not shown) or it can be tapped from an optical circuit, e.g., a WDM or DWDM network (not shown), depending on application and requirements. In the present embodiment optical signal 12 is a telecommunication signal that carries information at discrete wavelengths $\lambda_1$ through $\lambda_n$ which correspond to the I.T.U. grid frequencies. At any one time only one wavelength is used. In the present case optical signal 12 is propagating at wavelength $\lambda_i$ while the other wavelengths are inactive, as indicated by dashed lines.

A tap in the form of a beam splitter 13 is provided in the path of optical signal 12 for diverting a small fraction 12' of optical signal 12 to a power detector 15. Power detector 15 serves to determine an input reference power Pref of optical signal 12 based on diverted fraction 12'.

Figure 1B:
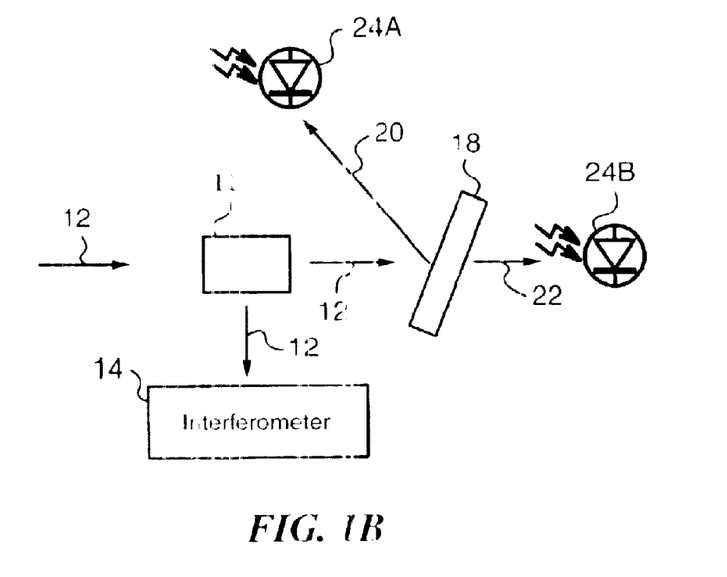
FIG. 1B is a diagram of an alternative embodiment of a portion of the apparatus of FIG. 1A.

After passing through beam splitter 13 optical signal 12 is directed to an interferometer 14 which may be a Mach-Zehnder, Michelson, Fizeau, Fabry-Perot etalon such as a wedge etalon or other suitable interferometer. In accordance with standard principles of interferometry, interferometer 14 divides optical signal 12 into two beams $P1_{\lambda_i}$ and $P2_{\lambda_i}$ and recombines them to form an interference pattern 16. Interferometer 14 is constructed to also pass optical signal 12 to an optical filter 18. Alternatively, optical signal 12 can be first divided by a divider 11, e.g., by a beam splitter, and a portion of it can be delivered to interferometer 14 while another portion is delivered to optical filter 18, as illustrated in FIG. 1B.

Referring back to FIG. 1A, optical filter 18 is a transmission and reflection filter with a wavelength-dependent response. In particular, filter 18 reflects a reflected portion 20 of signal 12 and transmits a transmitted portion 22 of signal 12. In other words, portions 20, 22 represent filter's 18 wavelength-dependent response. The intensities reflected and transmitted portions 20, 22 vary as a function of the wavelength of signal 12. Preferably, optical filter 18 has a linear wavelength-dependent response such that the variation of the intensities of portions 20, 22 is linear as a function of wavelength.

A detection mechanism 24 is provided for determining a coarse wavelength response 25 from the wavelength-dependent response of filter 18. In this embodiment detection mechanism 24 consists of a first photodetector 24A for receiving reflected portion 20, and a second photodetector 24B for receiving transmitted portion 22. In other words, both reflectance R and transmittance T of filter 18 are monitored by photodetectors 24A, 24B. Photodetectors 24A, 24B are connected to a coarse computing circuit 24C. Circuit 24C is designed to derive a coarse wavelength response from the reflectance R and transmittance T measurements.

It should be noted that in alternative embodiments detection mechanism 24 can consist of just first photodetector 24A or just second photodetector 24B. In these embodiments only reflected portion 20 or only transmitted portion 22 is measured by first photodetector 24A or second photodetector 24B, respectively. The coarse wavelength response is derived by circuit 24C from reflectance R or transmittance T only in these embodiments.

In still another embodiment, optical filter 18 can be of the type producing a direct electronic wavelength-dependent response, preferably a linear electronic wavelength-dependent response 26. In this case optical filter 18 can be a phototransistor, a photodiode or other suitable element. Also, in this alternative detection mechanism 24 has a coarse computing circuit 24C', as indicated by dashed lines.

Apparatus 10 has two photodetectors 28, 30 placed in interference pattern 16 at a quadrature separation 32 from each other. In other words, photodetectors 28, 30 are positioned at locations in interference pattern 16 that are $\pi/4$ or 90° out of phase. Alternatively, photodetectors 28, 30 can be placed at other quadrature separations such as $3\pi/4$, $5\pi/4$, $7\pi/4$, etc. from each other. Photodetectors 28, 30 generate two corresponding intensity signals 34A, 34B from which a unit or fine computing circuit 36 determines a fine wavelength response 38.

Apparatus 10 is also equipped with a processing logic 40 for determining the wavelength of optical signal 12 from coarse and fine wavelength responses 25, 38. Processing logic 40 can be any suitable circuit, preferably with a display 42 for showing the calculated wavelength $\lambda_{calc}$ of optical signal 12 to a user. A person skilled in the art will recognize that in a practical application coarse computing circuit 24C, fine computing circuit 36 and processing logic 40 can all be integrated into a single electronic device, e.g., a computer or other suitable information processing circuitry.

During operation, apparatus 10 determines the wavelength of optical signal 12 by combining coarse and fine wavelength responses 25, 38. In the present embodiment, optical signal 12 is at wavelength $\lambda_i$, selected among wavelengths $\lambda_1$ through $\lambda_n$ of the ITU grid. As the wavelength of optical signal 12 changes, interference pattern 16 shifts, as indicated by the dashed line. The shift in interference pattern 16 yields a change in fine wavelength response 38. Meanwhile, the intensities of reflected and transmitted portions 20, 22 also vary, thus changing coarse wavelength response 25.

Figure 2:
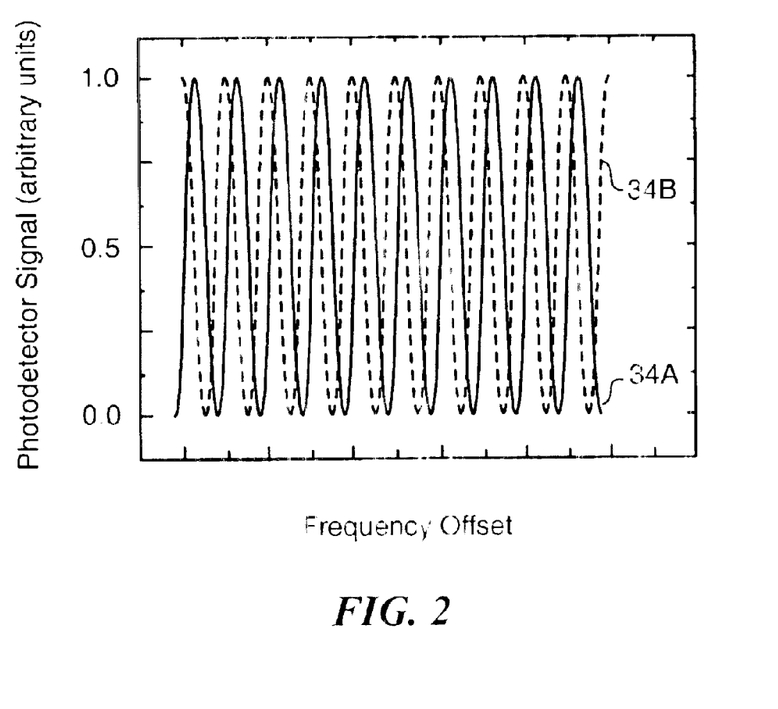
FIG. 2 shows the signal responses from the two photodiodes in the fringe pattern, as a function of frequency offset from an arbitrary reference frequency.

To obtain fine wavelength response 38 photodetectors 28, 30 provide electrical signals 34A, 34B corresponding to the intensity of light at discrete points along interference pattern 16. Thus, each photodetector 28, 30 detects a sinusoidally varying intensity signal 34A, 34B, but because of their quadrature separation one will detect a signal that is phase shifted by 90° with respect to the other. These two intensity signals 34A, 34B are illustrated in FIG. 2 as a function of frequency offset from an arbitrary reference frequency.

Figure 3:
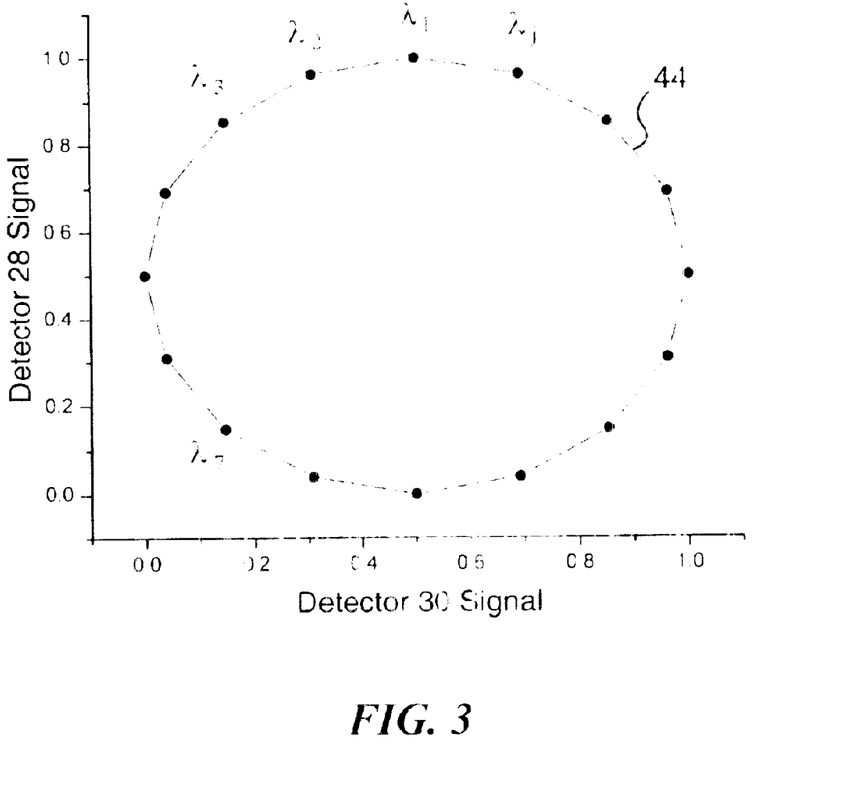
FIG. 3 illustrates an example plot (circular curve) in 2-D space, obtained if two detector signals are plotted one against the other.

In a preferred method, fine computing circuit 36 analyzes or plots intensity signals 34A, 34B obtained from photodetectors 28, 30 in an x-y plane, as shown in FIG. 3. By doing this fine computing circuit 36 produces a circular graph 44. Graph 44 corresponds to the locus of points produced by intensity signals 34A, 34B graphed along the x and y axes as interference pattern 16 shifts with changing wavelength of optical signal 12. Graph 44 is cyclical and its radius is proportional to the power of optical signal 12. Graph 44 starts to repeat itself as the wavelength of optical signal 12 increases or decreases by an integral multiple of a free spectral range (FSR) of interferometer 14. Therefore, graph 44 is not sufficient to determine the actual wavelength of optical signal 12.

For explanation purposes, a number of operating wavelengths $\lambda_1$ through $\lambda_j$ within one FSR of interferometer 14 have been designated at corresponding points on graph 44. In the present example, operating wavelengths $\lambda_1$ through $\lambda_j$ correspond to evenly spaced channels of the I.T.U. grid (e.g., 25 GHz separated channels; $\Delta\lambda$=25 GHz) contained within one FSR of interferometer 14. Thus, the FSR describes the "orbit" of graph 44 and can be expressed as:

$$FSR = j\Delta\lambda.$$

Of course, a person skilled in the art will recognize that this represents the special case where the FSR contains exactly the integral number j of operating wavelengths $\lambda_1$ through $\lambda_j$. In general, this need not be true and the case of $FSR \neq j\Delta\lambda$ is addressed below.

Since locating a point on graph 44 is not sufficient to uniquely identify the wavelength for the reasons explained above, fine computing circuit 36 only determines fine wavelength response 38. In other words, fine wavelength response 38 identifies a point on the orbit corresponding to intensity signals 34A, 34B. In the present case, where $FSR=j\Delta\lambda$, this point represents a number of possible wavelengths separated by the FSR, as follows:

$$\lambda \in \{\lambda_x, \lambda_x + j\Delta\lambda, \lambda_x + 2j\Delta\lambda, \ldots \lambda_x + Nj\Delta\lambda\} \text{ or}$$

$$\lambda \in \{\lambda_x, \lambda_x + FSR, \lambda_x + 2FSR, \ldots \lambda_x + N \cdot FSR\},$$

where N·FSR spans the entire range of wavelengths available to optical signal 12. For simplicity of notation, the wavelengths in this set will be denoted as $\lambda_{x+nj}$, where n=0, 1, 2, . . . N.

Since computing circuit 36 cannot discriminate between individual wavelengths $\lambda_{x+nj}$ of the set because they all correspond to the same point on graph 44, coarse wavelength response 25 from coarse computing circuit 24C is required to resolve the ambiguity. Coarse wavelength response 25 has to have a sufficient resolution to enable one to select the actual wavelength $\lambda$ from among wavelength $\lambda_{x+nj}$ of the set. This means that coarse wavelength response 25, and consequently optical filter 18, do not have to be accurate enough to resolve wavelengths $\lambda_x$ and $\lambda_x + \Delta\lambda$.

Figure 4:
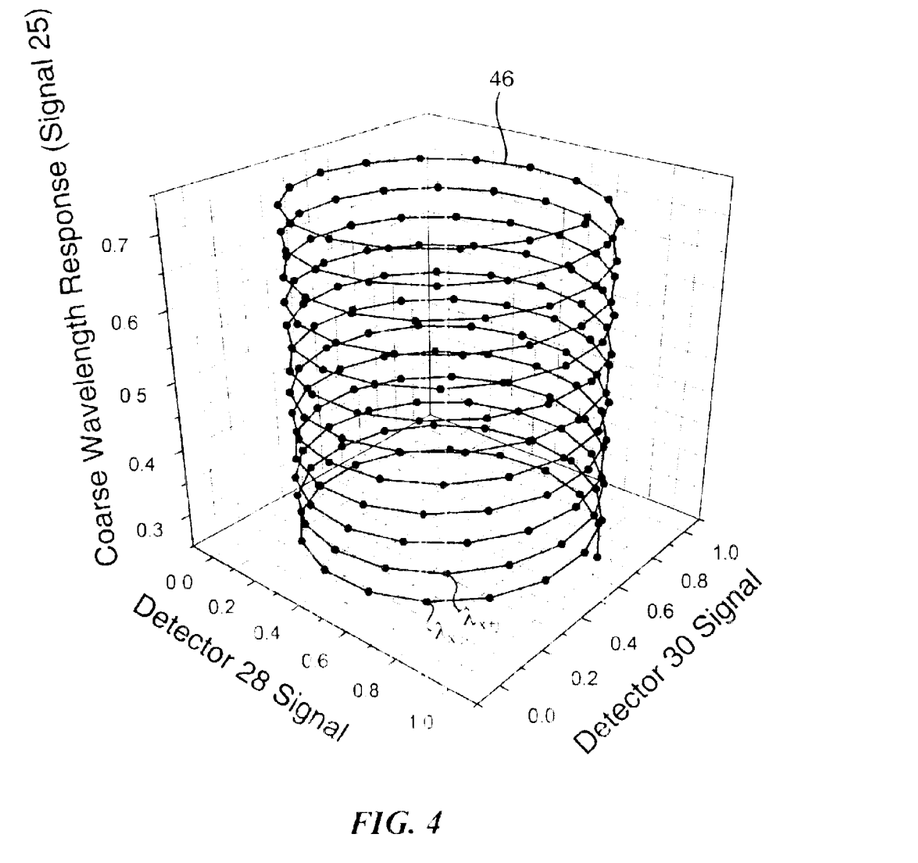
FIG. 4 illustrates an example plot of a helix curve in 3-D space, obtained when fine and coarse wavelength responses from the detectors are plotted against each other, according to a preferred method of the invention.

Preferably, coarse wavelength response 25 is plotted along a z-axis to yield graph 46, as shown in FIG. 4. The 3-dimensional representation of the fine wavelength response 38 and coarse wavelength response 25 of graph 46 traces a helix or corkscrew pattern and enables a particularly simple visualization of the wavelength $\lambda$ of optical signal 12. In particular, it can be clearly seen how wavelengths $\lambda_x$ and $\lambda_{x+j}$ on successive orbits are now resolved along the z-axis.

A person skilled in the art will notice that in graph 46 successive wavelengths $\lambda_x$ and $\lambda_{x+j}$ do not actually correspond to exactly the same location on the orbit in the x-y plane but are slightly offset. In other words, these successive wavelengths are slightly resolved in the x-y plane. That is because in the case shown the FSR of interferometer 14 is not exactly equal to $j\Delta\lambda$, i.e., $FSR \neq j\Delta\lambda$.

In the present example the actual operating wavelength of optical signal 12 received by apparatus 10 is $\lambda_i$ and belongs to one of the wavelengths $\lambda_1$ through $\lambda_n$ defined by the ITU grid. Processing logic 40 determines wavelength $\lambda_i$ by matching it to the closest wavelength among wavelengths $\lambda_1$ through $\lambda_n$ represented on graph 46. A person skilled in the art will recognize that it is desirable to first calibrate apparatus 10 by passing optical signal 12 at each one of wavelengths $\lambda_1$ through $\lambda_n$ through apparatus 10. It is also advantageous to display calculated wavelength $\lambda_{calc}$ on display 42 before matching it to the closest wavelength of the ITU grid. This can be done to inform the user how much wavelength $\lambda_i$ differs from the nearest wavelength prescribed by the ITU grid. In this case, corrective steps can be taken to adjust optical signal 12, e.g., by adjusting the semiconductor laser diode emitting optical signal 12 or taking other corrective action, as appropriate for the given WDM or DWDM network delivering optical signal 12.

In order to render the measurement of wavelength $\lambda_i$ immune to power fluctuations, it is advantageous to use the reference power Pref of optical signal 12 obtained from power detector 15 to normalize intensity signals 34A, 34B and coarse wavelength response 25. This can be done by dividing intensity signals 34A, 34B and wavelength response 25 by Pref or by other suitable normalization techniques known to those skilled in the art. With reference to the plot in FIG. 3, this normalization of intensity signals 34A and 34B makes the radius of graph 44 independent of the power of optical signal 12.

A person skilled in the art will recognize that the plots in FIGS. 3 and 4 are only provided to better explain the method of the invention. In practice, making these plots is not necessary. Instead, processing logic 40 can be programmed to perform automatic analysis of signals 25 and 38 that is equivalent to plots shown in FIGS. 3 and 4.

Figure 5:
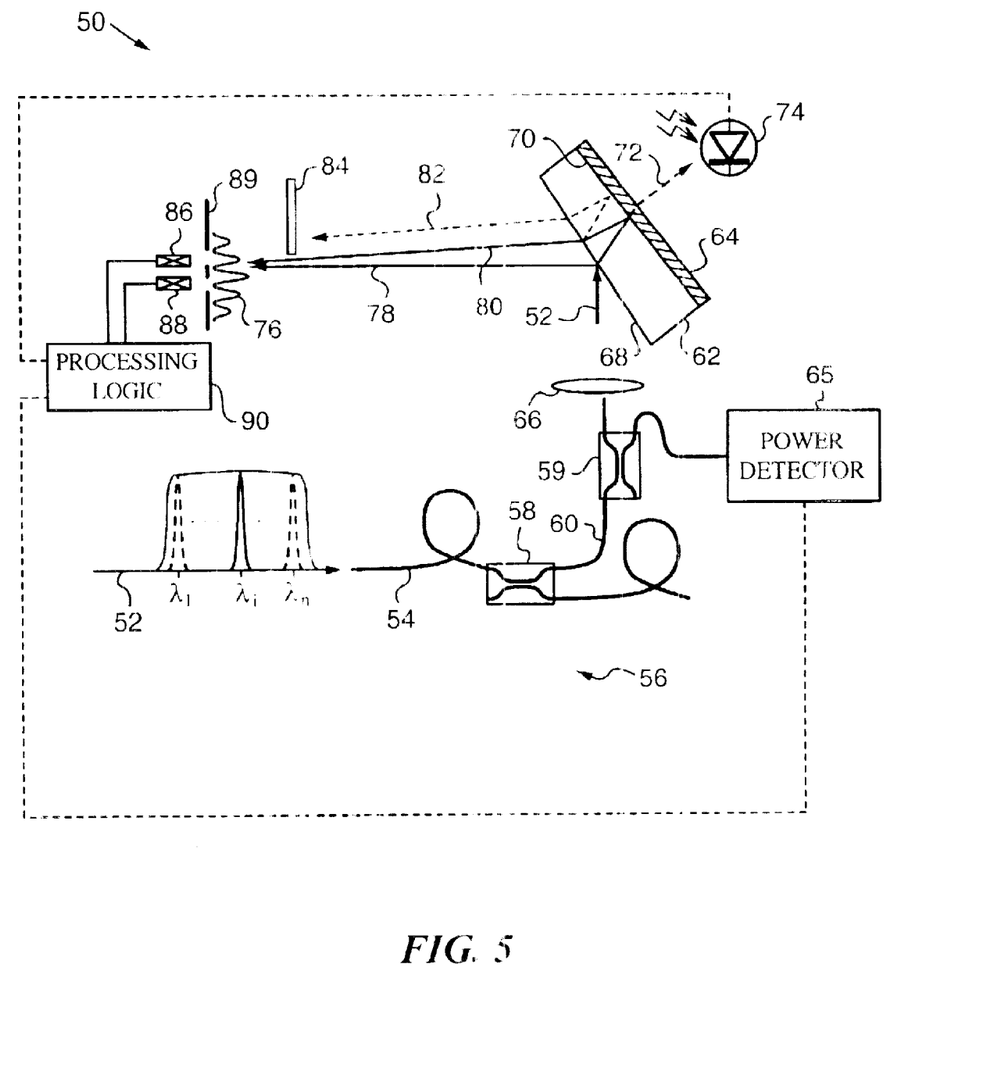
FIG. 5 is a diagram illustrating an apparatus for determining a wavelength of an optical signal according to a preferred embodiment of the invention.

An apparatus 50 employing the above-described principles in a preferred embodiment is illustrated in FIG. 5. Apparatus 50 is designed to monitor the operating wavelength of an optical signal 52 propagating through a fiber 54 of a DWDM network 56. Network 56 has a tap in the form of a coupler 58 for diverting a portion of optical signal 52, e.g., a few percent of the total intensity from network 56 for monitoring purposes. As in the previous embodiment, optical signal 52 can propagate at any wavelength determined by the I.T.U. grid between $\lambda_1$ and $\lambda_n$. In the present case optical signal 52 propagates at wavelength $\lambda_i$.

Coupler 58 couples optical signal 52 into a fiber 60 of apparatus 50. In the embodiment shown, a power detector 65 is used by apparatus 50 after coupler 58 to provide an input power reference Pref. A coupler 59 is used to couple a small portion of optical signal 52 to power detector 65 for these purposes.

An output facet of fiber 60 is arranged to emit optical signal 52 and collimate it on an integrated interferometer 62 and optical filter 64 with the aid of an optic 66. In the present embodiment optic 66 is a focusing lens, but it will be appreciated by a person skilled in the art that various alternative optical elements can be used to ensure that optical signal 52 is appropriately delivered to integrated interferometer 62 and optical filter 64.

In this preferred embodiment interferometer 62 is a wedge etalon with a front surface 68 and a back surface 70. More precisely, etalon 62 is a plate of fused silica with non-parallel surfaces 68, 70. Etalon 62 is preferably an optically polished dielectric plate having front surface 68 separated from almost co-parallel back surface 70 by a distance "d". The distance "d" is equal to a few tenths of a millimeter, and the plate is made of a material that is optically transparent in the desired wavelength range between $\lambda_1$ and $\lambda_n$.

Optical filter 64 is a reflection filter in the form of a coating deposited on back surface 70. Conveniently, coating 64 is a reflection filter over the wavelength range between $\lambda_1$ and $\lambda_n$. In fact, it is most preferable that the wavelength-dependent response of coating 64, i.e., its reflectivity, be linear with wavelength over the wavelength range between $\lambda_1$ and $\lambda_n$.

A person skilled in the art will recognize that it is also possible to use coating 64 whose wavelength-dependent response includes transmittance. In such an embodiment, the monitoring of a transmitted signal portion 72 is performed by a photodetector 74 positioned behind back surface 70 bearing coating 64, as indicated in dashed lines. In general, it is preferred to use a coating 64 that operates as a reflective coating only.

Interferometer 64 produces an interference pattern 76 between a first beam 78 reflected off its front surface 68 and a second beam 80 reflected off its back surface. Specifically, second beam 80 is transmitted into the wedge of interferometer 64 and undergoes internal reflection at back surface 70. Second beam 80 is then transmitted through front surface 68 and interferes with first beam 78 to form interference pattern 76. In order to eliminate the disruptive influence of high-order reflections generally indicated by 82 on interference pattern 76 an aperture 84 is provided in the beam path. Aperture 84 blocks high-order reflections 82.

Apparatus 50 is equipped with two photodetectors 86, 88, e.g., photodiodes, placed at two sampling points in interference pattern 76 at a quadrature separation from each other. Of course, photodetectors 86, 88 can be placed at other quadrature separations such as $3\pi/4$, $5\pi/4$, etc. Furthermore, photodetectors 86, 88 are placed at the point of intersection between axes of beams 78, 80. This point depends upon the angle of incidence of optical signal 52 on wedge etalon 62, the thickness of wedge etalon 62, the wedge angle of wedge etalon 62, and the distance to photodetectors 86, 88. If photodetectors 86, 88 are not placed at the point of intersection of the axes of beam 78, 80 they will register no interference unless the width of optical signal 52 is increased or the thickness of wedge etalon 62 is decreased. These measures, however, may in certain situations prevent the use of linear transmission filter coating 64 on wedge etalon 62, because of the inability to block multiple reflections within wedge etalon 62 before beams 78, 80 reach photodetectors 86, 88.

In this embodiment a slit pair 89 is provided proximate to wedge etalon 62 and in front of photodetectors 86, 88. Slit pair 89 is used to define two sampling points in interference pattern 76 corresponding to the constraints of quadrature separation and point of intersection between the axes of beams 78, 80. Photodetectors 86, 88 are placed at the two sampling points behind slit pair 89. In this embodiment the detection plane of photodetectors 86, 88 is coplanar with the active detection areas of photodetectors 86, 88 and contains the point of intersection between the axes of beams 78, 80.

Photodetectors 86, 88 are designed to generate two corresponding intensity signals and are connected to a processing logic 90. In this embodiment processing logic 90 includes both coarse and fine wavelength response computing circuitry.

During operation, processing logic 90 obtains readings from photodetectors 86, 88. These readings represent corresponding light intensity levels or power levels D1 and D2 of optical signal 52 in interference pattern 76. In addition, processing logic 90 receives a signal indicating reference power Pref of optical signal 52 from power detector 65.

In embodiments where the wavelength-dependent response of coating 70 includes transmittance and photodetector 74 is used to measure it, processing logic 90 further receives a power level D3 corresponding to transmitted signal portion 72 of optical signal 52. In this case, power level D3 represents the coarse wavelength response.

Processing circuit 90 preferably includes a lookup table for obtaining the wavelength of optical signal 52 from coarse and fine wavelength responses, as discussed above. For this purpose it is particularly convenient that lookup table relate power levels D1 and D2, representing the fine wavelength response, and power level D3 representing the coarse wavelength response, such that they are independent of fluctuations of the power in optical signal 12. As in the previous embodiment, this can be accomplished by dividing all power levels D1, D2 and D3 by reference power Pref or by other suitable normalization methods. The lookup table is then created based on the orbit and helix of the pattern of wavelengths as discussed above. In fact, a person skilled in the art will realize that in this case the functionality of processing circuit 90 and that of processing logic 40 of the previous embodiment can share common computing elements and processing steps in the determination of wavelength $\lambda_i$.

Alternatively, processing circuit 90 can determine the wavelength of optical signal 52 without measuring power level D3. In this case, coarse wavelength-response is simply the sum power D1+D2 obtained from both detectors 86, 88. The lookup table thus contains information to determine wavelength based on D1, D2 and sum D1+D2 only. Once again it is advantageous to divide D1, D2 and D1+D2 by reference power Pref to normalize the measurements and render them immune to input power fluctuations.

Figure 6:
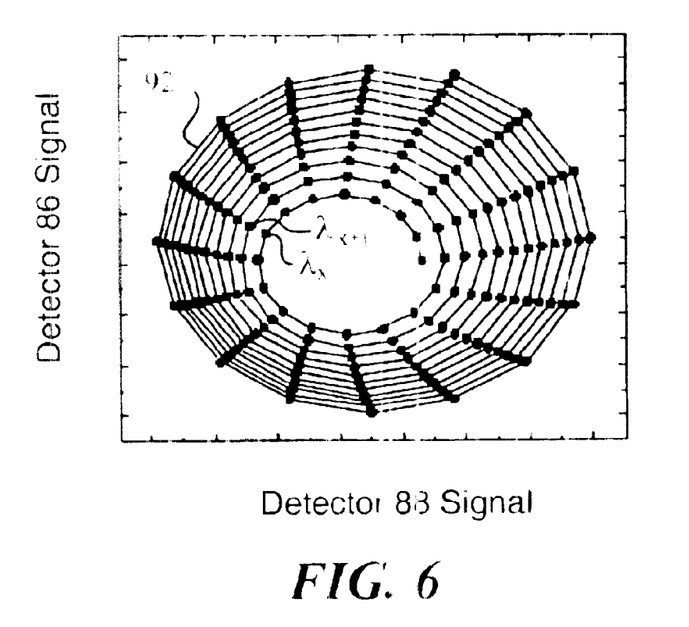
FIG. 6 illustrates an example plot (a spiral/aligned curve) in 2-D space, obtained if two detector signals are plotted one against the other, for numerous orbits, each orbit corresponding to the FSR of the interferometer.

In accordance with this embodiment, the wavelength of optical signal 52 is determined from a two-dimensional spiral 92 as shown in FIG. 6, rather than a helix. Spiral 92 is created because sum power D1+D2 representing coarse wavelength response changes as a function of wavelength, hence changing the radius of the orbit. It should be noted that the FSR of wedge etalon 62 determines the spacing of wavelengths $\lambda_x$ and $\lambda_{x+j}$ on successive orbits of spiral 92. In the case of spiral 92, this spacing is very close creating a close "overlap". Such overlap can make it difficult to distinguish between wavelengths on successive orbits of spiral 92. It is convenient to change this spacing or reduce the overlap through proper selection of the FSR of wedge etalon 62.

Figure 7:
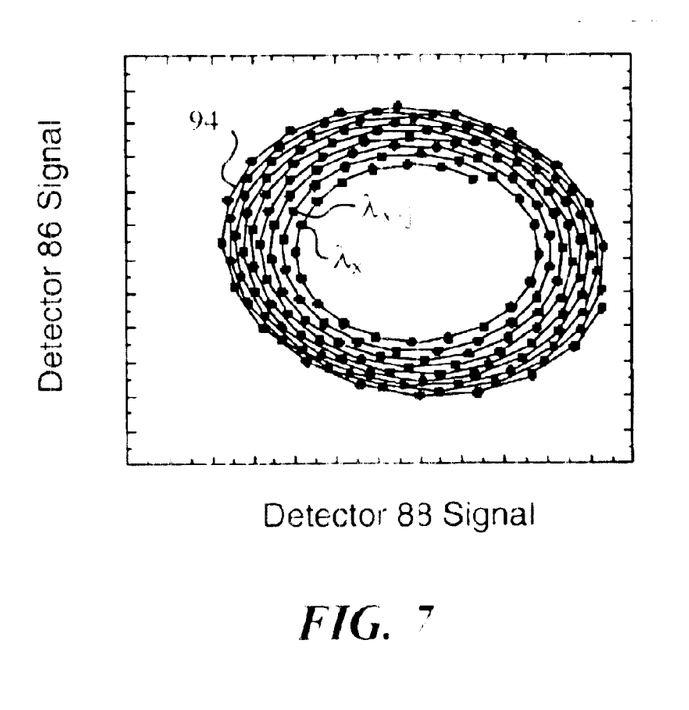
FIG. 7 illustrates an example plot (a spiral/offset curve) as a function of wavelength, where the etalon FSR is chosen so that channel points are more widely separated.

A two-dimensional spiral 94 of FIG. 7 illustrates the effect of changing the FSR on the overlap of wavelengths $\lambda_x$ and $\lambda_{x+j}$ on successive orbits of spiral 94. Clearly, the FSR producing spiral 94 is preferable for measurement purposes because of the much lower overlap, i.e., wider spacing, of wavelengths $\lambda_x$ and $\lambda_{x+j}$ on successive orbits. Thus, by selecting the appropriate FSR of wedge etalon 62 and utilizing processing logic 90, the responses detected for both the coarse and the fine wavelength readings, enable a rapid determination of wavelength of optical signal 52. In fact, the apparatus and method of invention can be efficiently applied to create a spiraling curve wherein each point on the spiral corresponds to a channel for channels with 25 GHz spacing.

EXAMPLE

The following example is intended to provide a person skilled in the art with specific parameters to be used in designing an apparatus analogous to the one discussed above in reference to FIG. 5. This example is provided for illustration purposes only and does not impose any limitations on the invention. In this example, sample optical signal 52 propagates through front surface 68 of 400 GHz etalon 62, whose back surface 70 bears a 60% reflective coating 64. Optical signal 52 undergoes refraction, and is reflected off back surface 70 to the front surface 68, and again undergoes refraction as it emerges through front surface 68 in the form of second beam 80. Also, a portion of optical signal 52 is reflected off front surface 68 of etalon 62 in the form of first beam 78.

In essence, etalon 62 splits the optical signal 52 into beams 78, 80 representing two copies of the optical signal 52 with slightly different propagation directions. Etalon 62 is designed such that the desired beam angle is produced between the reflected beams 78, 80 it produces, the desired beam angle producing interference pattern 76 at photodetectors 86, 88.

A 33 μm spatial period corresponds to a difference in beam propagation angles of α=1.545/33=46.8 mrad. To achieve this angle, a fused silica interferometer wedge 62 placed at 45 degrees angle of incidence will have a wedge angle given by:

$$w = \frac{\alpha}{2n} \frac{\cos\theta_{inside}}{\cos\theta_{outside}} = 13 \text{ mrad}$$

The thickness of interferometer 62 is determined by the separation of first and second beams 78, 80 at the interferometer and the incident angle. For an angle α of 46.8 mrad, the thickness of wedge 62 required to place the point of intersection 3.5 mm downstream of wedge 62 is about 0.22 mm of fused silica, which corresponds to an FSR of about 500 GHz, or 20 channels at 25 GHz.

The wavelength resolution of the devices described above depends on the signal-to-noise ratios (defined in voltage as V_sig/V_rms noise) of detectors 86, 88 and electronics. The two intensity detectors 86 and 88 are primarily there to determine the ultimate wavelength resolution, whereas the filter detector is primarily used only to distinguish between adjacent orbits. The path length (in voltage) along a detector orbit is simply $\pi V_{max}$, where $V_{max}$ is the largest signal on either detectors 86 or 88. The frequency resolution is thus:

$$\Delta f = \frac{FSR}{\pi(S/N)},$$

or in the case of the example above and a detector signal-to-noise of 500:1, the resolution attainable by the wavelength determination apparatus is in the region of 250 MHz. The required S/N of the filter detector means must exceed the number of orbits in the total frequency range (10 THz for C- and L-bands). Again, for the example above, this corresponds to a signal-to-noise ratio of about 25 on the filter detector means. By choosing a different etalon, it is possible to balance the S/N requirements of all three detectors. For instance, with a S/N ratio of 200 on all three detectors, and an etalon whose free spectral range is about 50 GHz, gives an overall device resolution of 80 MHz. A detector S/N of 1000:1 with a 25 GHz etalon could in principle drive the resolution to 10 MHz or better.

The detector pitch may, for example, be in the order of 25 microns, and the active areas of photodetectors 86, 88 (rectangular as illustrated) may be 15 microns wide and 50 microns tall, the rectangular areas separated by about 10 microns.

A person skilled in the art will recognize that the above parameters are merely provided for example purposes. In general, it is conceivable that the footprint of the photodetector's rectangular active areas could be utilized as areas over which the interference pattern is sampled. However, utilizing the detector areas themselves as sampling areas for sampling the interference pattern, may place undesirable tight tolerances on the manufacture of the wedge etalon. Hence, preferably, the slit pair shown in FIG. 5 is used to provide two distinct predetermined points at which the interference pattern can be sampled.

The filter can be any suitable device in which the wavelength-dependent response is an electrical response, e.g. a photosensitive element, sufficiently precise to determine the coarse wavelength measurement. The filter can comprise a transmission filter, a reflection filter, or a wavelength filter, which preferably exhibits a linear wavelength-dependent response. The filter may be discrete or take the form of a coating, for example, a coating deposited on the back face of the etalon, as indicated in FIG. 5, e.g. 60% front and 10–90% linear reflectivity coating (over the range of 1520–1620 nm).

Preferably the photodetectors detect the intensities of the beams to determine wavelength. However, as understood by one of ordinary skill in the art, the phase of the beams can also be utilized.

In this embodiment, high reflectivity coatings have been employed, as a consequence, it is important that additional reflections, in particular high-order reflections (other than those required) from the interferometer, are prevented from reaching the photodetectors. The aperture 84 as shown, achieves this objective.

It is known by those skilled in the art that temperature variations can have a significant impact on the performance of the overall apparatus via the temperature dependence of the wedged etalon. However, since there are no "dead zones" in the wavelength response of the wavelength determination apparatus according to the present invention, the effect of temperature can be minimized by, for example, a thermistor mounted on the wedged etalon, and a software look-up table. There is therefore no "cliff" in the thermal operation, only a degradation of the effective S/N of the detectors that can be minimized by appropriate thermo-mechanical design.

In addition, because the reflection of optical signal 52 from wedge 62 occurs at an angle, the reflection coefficients of front and back surfaces will depend on input polarization of optical signal 52. The resulting polarization-induced noise can lead to a degradation of the resolution of the apparatus. Therefore, it is convenient to employ dielectric coatings on all optical surfaces which are inclined relative to optical signal 52 to make the apparatus polarization independent.

In a second polarization-independent embodiment of the wavelength determination apparatus, a small piece of birefringent material, such as lithium niobate, sapphire, or calcite, oriented properly, can be used to separate orthogonal polarizations into two independent beams displaced from each other by a specific distance. A half wave plate on one beam to rotate the polarization can be employed to ensure that both beams experience the same reflection and transmission coefficients on the optics. Using the same etalon and linear transmission filter combination, the wavelength of each polarization is measured independently using two independent sets of detectors located one above the other. Doubling the number of detectors can be achieved by a custom photodetector assembly without a substantial increase in manufacturing cost.

It will be clear to one skilled in the art that the above embodiments may be altered in many ways without departing from the scope of the invention. Accordingly, the scope of the invention should be determined by the following claims and their legal equivalents.

What is claimed is:

1. An apparatus for determining a wavelength of an optical signal, said apparatus comprising:
    a) an optical filter for providing a wavelength-dependent response to said optical signal;
    b) a detection means for determining a coarse wavelength response from said wavelength-dependent response;
    c) an interferometer for receiving said optical signal and generating therefrom an interference pattern;
    d) two photodetectors placed in said interference pattern at a quadrature separation from each other for generating two corresponding intensity signals;
    e) a unit for determining a fine wavelength response from said two intensity signals; and
    f) a processing logic for determining said wavelength from said coarse wavelength response and said fine wavelength response.

2. The apparatus of claim 1, wherein said interferometer comprises an etalon.

3. The apparatus of claim 2, wherein said etalon is a wedge etalon.

4. The apparatus of claim 1, further comprising an aperture for substantially preventing high-order reflections from propagating from said interferometer to said two photodetectors.

5. The apparatus of claim 1, wherein said wavelength-dependent response is linear.

6. The apparatus of claim 1, wherein said optical filter is a transmission filter.

7. The apparatus of claim 6, wherein said transmission filter comprises a coating.

8. The apparatus of claim 1, wherein said optical filter is a reflection filter.

9. The apparatus of claim 8, wherein said reflection filter comprises a coating.

10. The apparatus of claim 9, wherein said interferometer is an etalon and said coating is deposited on a back surface of said etalon.

11. The apparatus of claim 9, wherein said wavelength-dependent response is linear.

12. An apparatus for determining a wavelength of an optical signal, said apparatus comprising:
    a) an optical filter for providing a wavelength-dependent response to said optical signal;
    b) a detector for determining a coarse wavelength response from said wavelength-dependent response;
    c) an interferometer for receiving said optical signal and generating therefrom an interference pattern;
    d) two photodetectors placed in said interference pattern at a quadrature separation from each other for generating two corresponding intensity signals; and
    e) a processing logic for determining said wavelength from said coarse wavelength response and said two intensity signals.

13. The apparatus of claim 12, wherein said interferometer comprises a wedge etalon.

14. The apparatus of claim 12, further comprising an aperture for substantially preventing high-order reflections from propagating from said interferometer to said two photodetectors.

15. The apparatus of claim 12, further comprising a power detector for detecting a reference power Pref of said optical signal.

16. The apparatus of claim 12, wherein said optical filter comprises a wavelength filter in which said wavelength-dependent response is linear.

17. The apparatus of claim 12, wherein said optical filter is a transmission filter.

18. The apparatus of claim 12, wherein said optical filter is a reflection filter.

19. The apparatus of claim 12, further comprising a slit pair disposed proximate to said interferometer for defining two sampling points in said interference pattern, said two photodetectors being positioned at said two sampling points.

20. The apparatus of claim 12, wherein said interferometer generates two beams such that the axes of said two beams have a point of intersection, said two photodetectors being placed such that a detection plane of said two photodetectors contains said point of intersection.

21. An apparatus for determining a wavelength of an optical signal, said apparatus comprising:
    a) a wedge etalon having a front surface, a back surface and a coating, said wedge etalon receiving said optical signal through said front surface and generating therefrom an interference pattern;
    b) two photodetectors placed in said interference pattern at a quadrature separation from each other for generating two corresponding intensity signals; and
    c) a processing logic for determining said wavelength from said two intensity signals.

22. The apparatus of claim 21, wherein a sum power of said two intensity signals comprises a coarse wavelength response.

23. The apparatus of claim 21, wherein said coating has a linear wavelength-dependent response to said optical signal.

24. The apparatus of claim 23, wherein said coating is deposited on said back surface.

25. The apparatus of claim 24, wherein said linear wavelength-dependent response comprises transmission or reflection.

26. The apparatus of claim 25, wherein said wavelength-dependent response comprises transmission and said apparatus further comprises a photodetector for measuring said transmission.

27. The apparatus of claim 21, further comprising an aperture for substantially preventing high-order reflections from propagating from said wedge etalon to said two photodetectors.

28. The apparatus of claim 21, further comprising a power detector for detecting a reference power Pref of said optical signal.

29. The apparatus of claim 21, further comprising a slit pair disposed proximate to said wedge etalon for defining two sampling points in said interference pattern, said two photodetectors being positioned at said two sampling points.

30. The apparatus of claim 21, wherein said wedge etalon generates two beams such that the axes of said two beams have a point of intersection, said two photodetectors being placed such that a detection plane of said two photodetectors contains said point of intersection.

31. A method for determining a wavelength of an optical signal, said method comprising:
 a) providing an optical filter having a wavelength-dependent response to said optical signal;
 b) passing said optical signal through said optical filter;
 c) determining a coarse wavelength response from said wavelength-dependent response;
 d) passing said optical signal through an interferometer for generating an interference pattern;
 e) placing two photodetectors in said interference pattern at a quadrature separation from each other for generating two corresponding intensity signals;
 f) determining a fine wavelength response from said two intensity signals; and
 g) determining said wavelength from said coarse wavelength response and said fine wavelength response.

32. The method of claim 31, wherein said coarse wavelength response is determined by a sum power measurement from said two photodetectors.

33. The method of claim 31, further comprising integrating said optical filter with said interferometer.

34. The method of claim 31, further comprising substantially eliminating high-order reflections from propagating from said interferometer to said two photodetectors.

35. A method for determining a wavelength of an optical signal, said method comprising:
 a) passing said optical signal through an optical filter having a wavelength-dependent response to said optical signal;
 b) determining a coarse wavelength response from said wavelength-dependent response;
 c) passing said optical signal through an interferometer to generate an interference pattern;
 d) sampling said fringe pattern at two sampling points at a quadrature separation from each other to generate two corresponding intensity signals; and
 e) determining said wavelength from said coarse wavelength response and said two intensity signals.

36. The method of claim 35, wherein said interferometer is a wedge etalon having a front surface and a back surface, and said interference pattern in generated by introducing said optical signal into said wedge etalon through said front surface.

37. The method of claim 35, further comprising substantially eliminating high-order reflections from propagating from said interferometer to said two photodetectors.

38. The method of claim 35, further comprising measuring a reference power Pref of said optical signal and normalizing said two intensity signals with the aid of said reference power.

39. The method of claim 35, wherein said optical filter is selected to have a linear wavelength response.

40. The method of claim 35, wherein said wavelength-dependent response comprises transmission.

41. The method of claim 35, wherein said wavelength-dependent response comprises reflection.

42. The method of claim 35, further comprising imaging said interference pattern through a slit pair.

43. A method for determining a wavelength of an optical signal, said method comprising:
 a) passing said optical signal through a wedge etalon having a front surface, a back surface and a coating to generate an interference pattern;
 b) sampling said fringe pattern at two sampling points at a quadrature separation from each other to generate two corresponding intensity signals; and
 c) determining said wavelength from said intensity signals.

44. The method of claim 43, wherein said coating is selected to exhibit a linear wavelength-response.

45. The method of claim 44, wherein said coating is deposited on said back surface.

46. The method of claim 43, further comprising substantially eliminating high-order reflections from propagating from said interferometer to said two photodetectors by passing said interference pattern through an aperture.

47. The method of claim 43, further comprising measuring a reference power Pref of said optical signal and normalizing said two intensity signals with the aid of said reference power.

48. The method of claim 43, further comprising imaging said interference pattern through a slit pair.

* * * * *